L. C. PALMER.
PAPER FEEDING AND CUTTING MECHANISM.
APPLICATION FILED JULY 9, 1919.

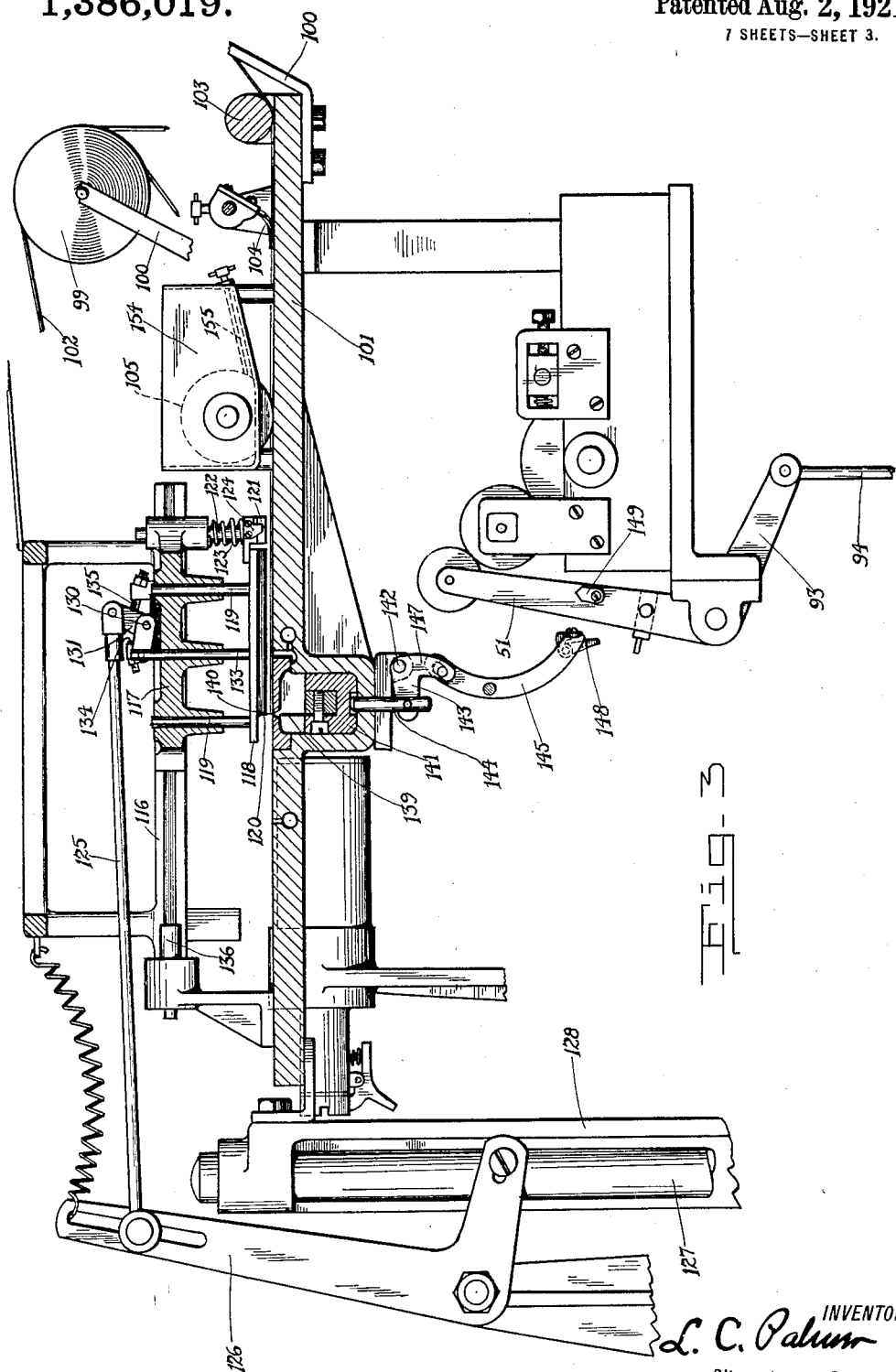

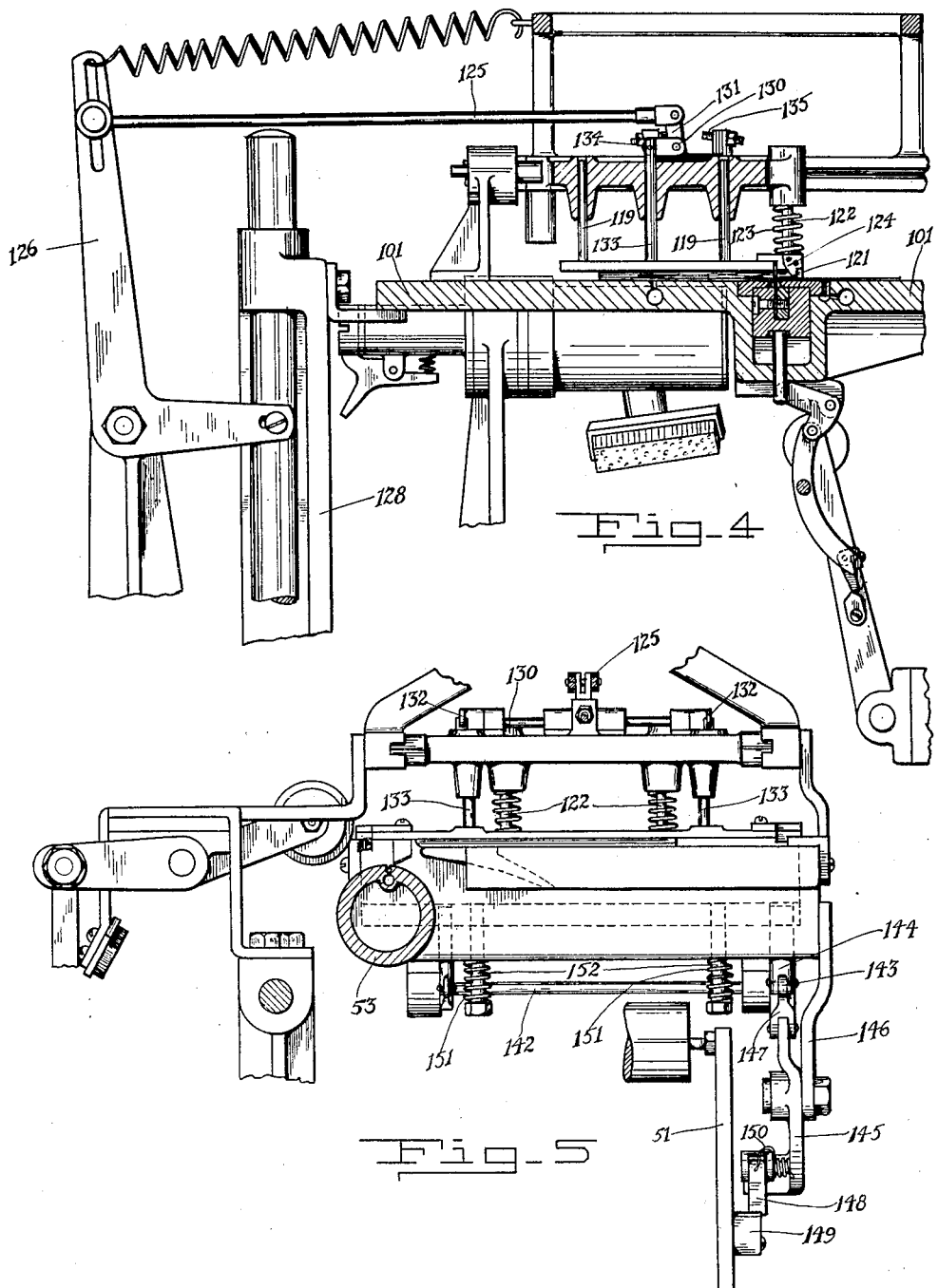

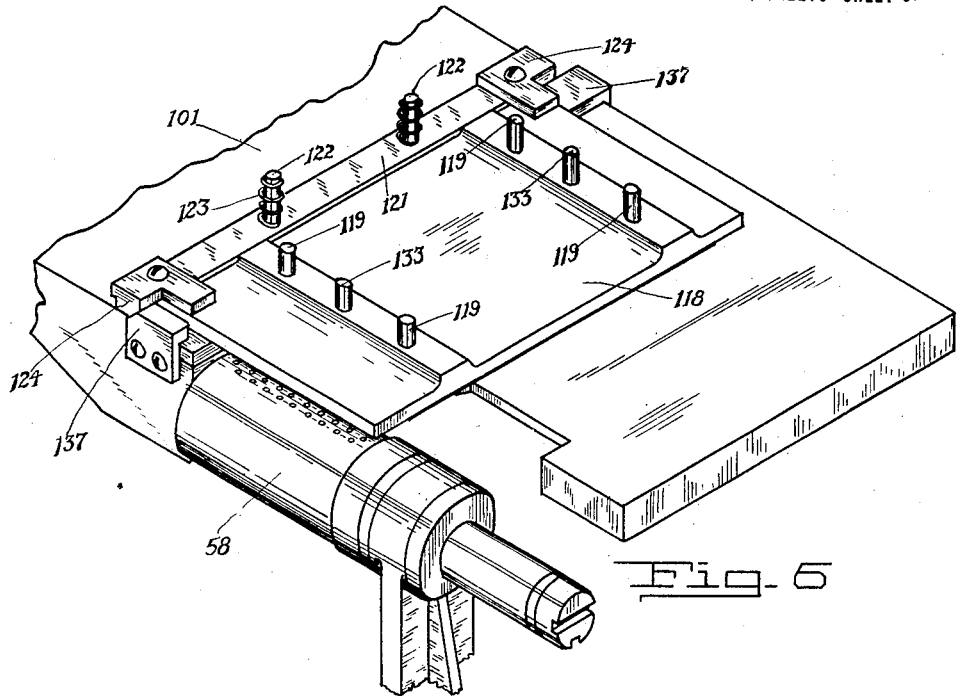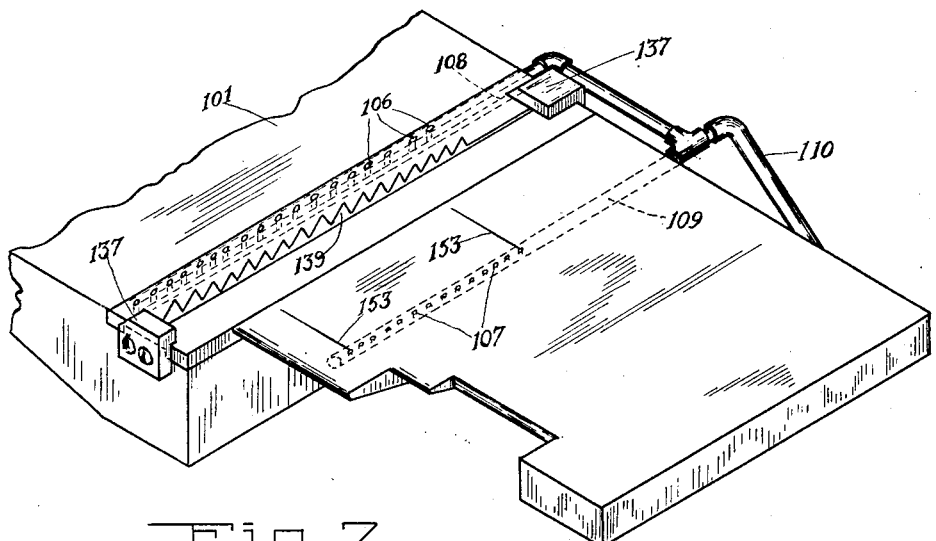

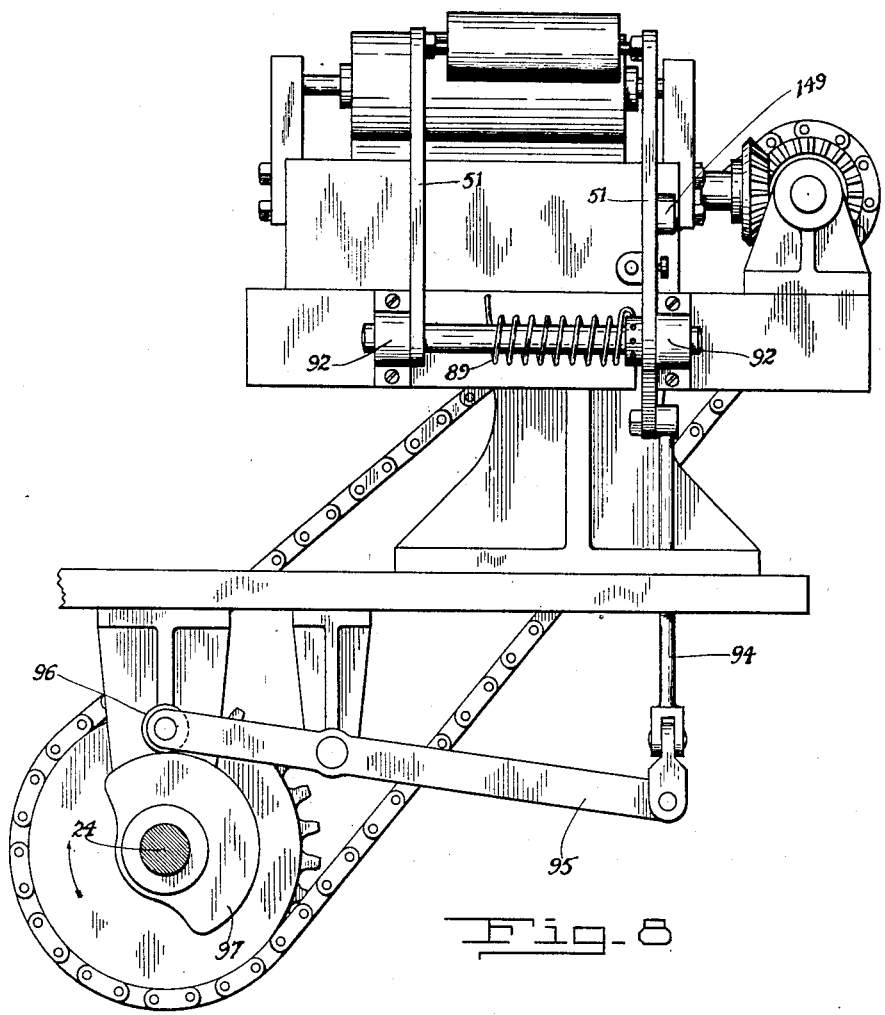

1,386,019.

Patented Aug. 2, 1921.

INVENTOR
L. C. Palmer
BY
Dull, Warfield & Dull
ATTORNEY

UNITED STATES PATENT OFFICE.

LYNDON C. PALMER, OF BUFFALO, NEW YORK, ASSIGNOR TO F. N. BURT COMPANY, LIMITED, OF TORONTO, ONTARIO, CANADA, A CORPORATION OF ONTARIO, CANADA.

PAPER FEEDING AND CUTTING MECHANISM.

1,386,019.  Specification of Letters Patent.  Patented Aug. 2, 1921.

Original application filed May 14, 1918, Serial No. 234,416. Patent No. 1,312,570, dated August 12, 1919. Divided and this application filed July 9, 1919. Serial No. 309,709.

*To all whom it may concern:*

Be it known that I, LYNDON C. PALMER, a citizen of the United States, residing at Buffalo, in the county of Erie and State of New York, have invented certain new and useful Improvements in Paper Feeding and Cutting Mechanism, of which the following is a full, clear, and exact description, such as will enable others skilled in the art to which it appertains to make and use the same.

This invention relates to mechanism for producing sheets of predetermined length from a web, and with respect to its more specific features, to mechanism for feeding and cutting a tissue paper web.

One of the objects of the invention is the provision of practical and efficient paper feeding and controlling mechanism; mechanism especially adapted for automatically operating upon thin paper, as tissue paper.

Another object of the invention is the provision of efficient and practical automatically operable tissue paper cutting mechanism.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification, wherein similar reference characters refer to similar parts throughout the several views,—

Fig. 3 is a longitudinal sectional elevation of the paper feed table and the paper feeding and cutting mechanisms;

Fig. 4 is a sectional elevation of some of the parts of Fig. 3, in a different position from those in Fig. 3;

Fig. 5 is an end view of the feed table and parts associated therewith;

Fig. 6 is a perspective view of a detail of the feed table and the paper feed mechanism;

Fig. 7 is a perspective view of a detail of the feed table with the paper feed mechanism removed, and showing the cutter projecting thereabove;

Fig. 8 is an end view of certain details showing the cutter operating mechanism;

Figures 9, 10:
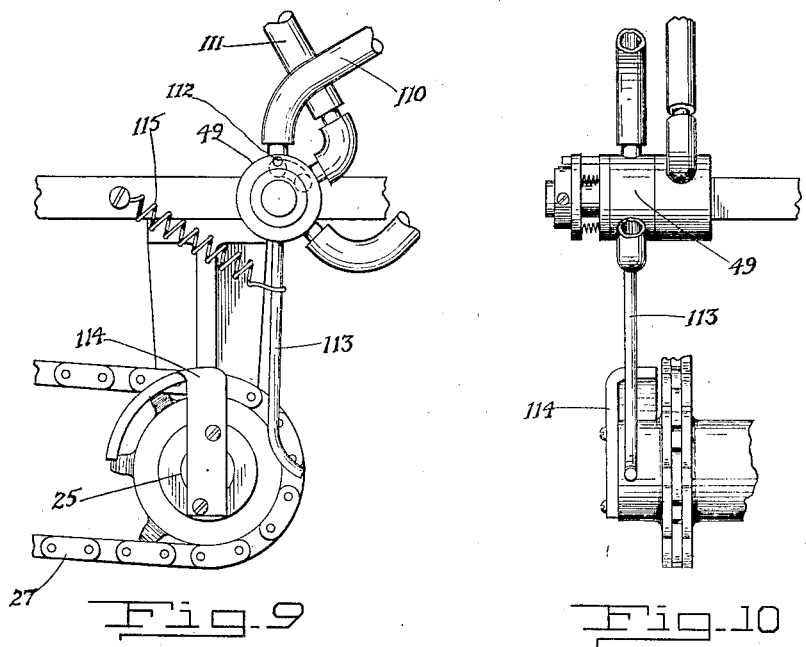
Figure 11:
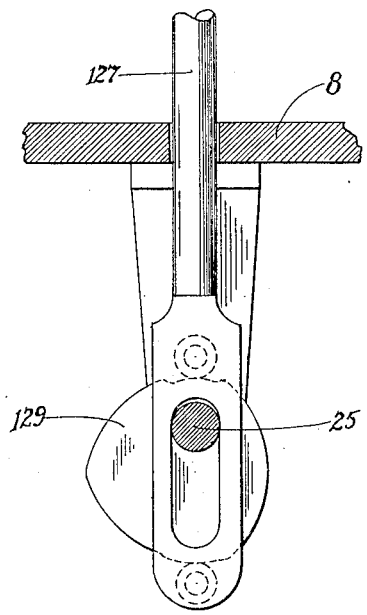

Figs. 9, 10, and 11 are further details.

The invention is illustrated in its embodiment in a machine for making paper boxes, the present application being a division of application filed May 14, 1918, Serial Number 234,416, patented August 12, 1919, No. 1,312,570, to which reference is made. The machine of the original application above referred to is designed to automatically make paper boxes embodying paper bags, the bag sides being made from a web of tissue paper from which sections are cut, folded into tubular form, heads affixed thereto and the whole assembled with relatively stiff paper bases, or box parts. The present application mainly concerns the mechanisms for feeding, cutting and controlling the tissue web from which the bag sides are formed.

Figure 1:
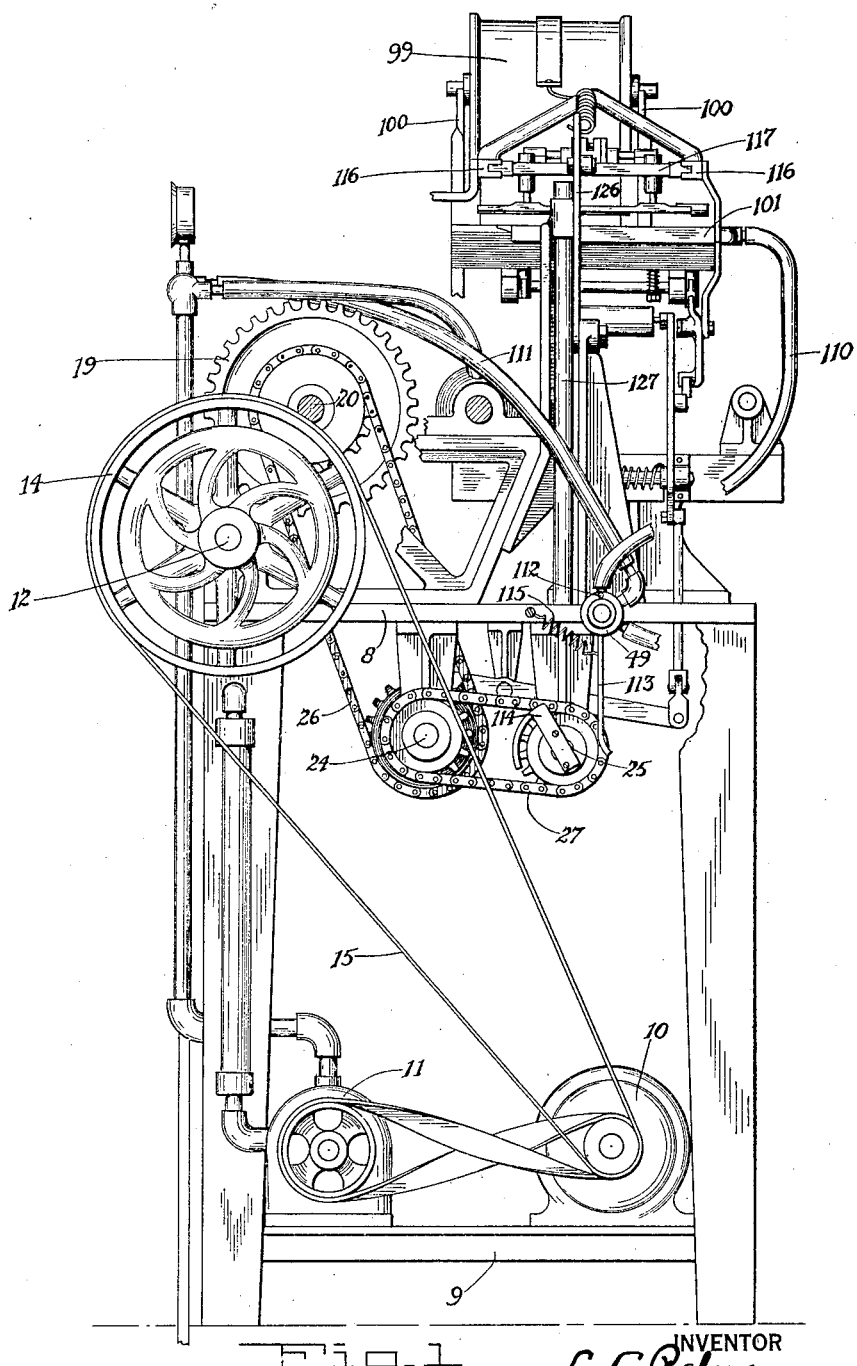
Figure 1 is a side elevation of a machine embodying the invention; certain parts being omitted for clearer disclosure.
Figure 2:
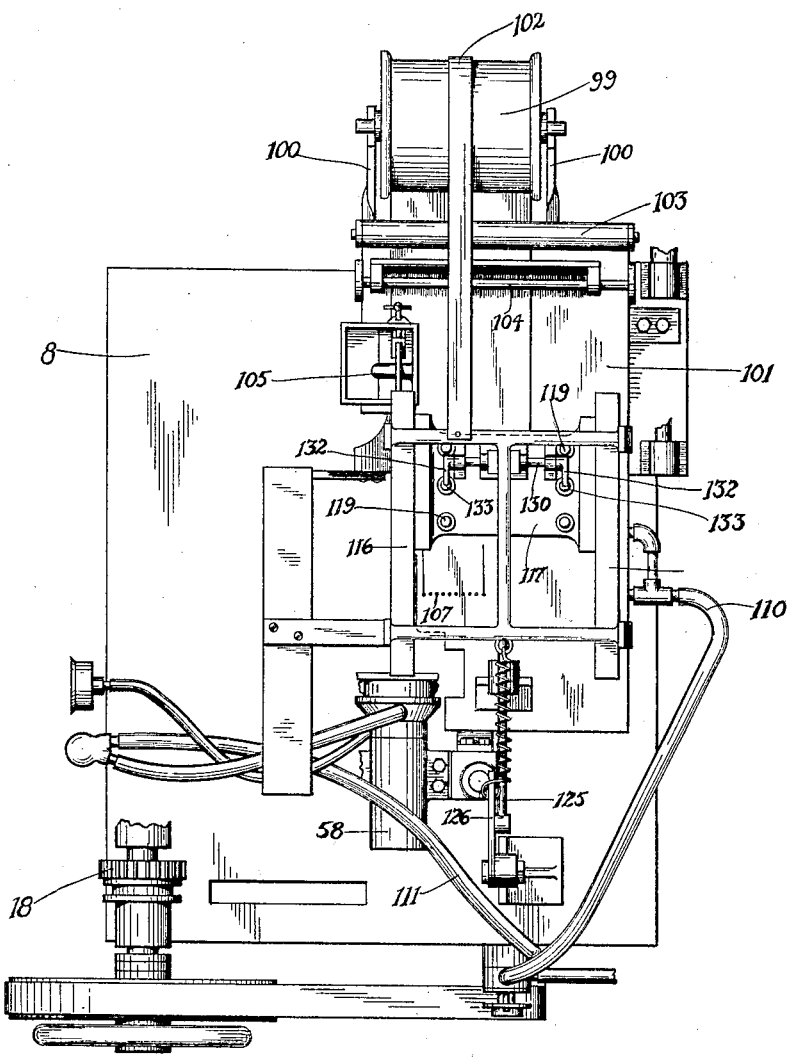
Fig. 2 is a plan view of certain parts of the machine.

In the complete box making machine there is provided a table 8, having a platform 9 on which latter is an electric motor 10, and a vacuum pump 11 driven from the motor. Supported by table 8 is a main driving shaft 12, driven by pulley 14 and belt 15. A pinion 19 on a counter shaft 20 is driven from shaft 12, through a main driving gear 18 (Fig. 2). Below table 8 is a main cam shaft 24 and a supplemental cam shaft 25, the main cam shaft being driven from the counter shaft 20 through the instrumentality of a chain 26, and the supplementary cam shaft being driven from the main cam shaft by a chain 27. The numeral 49 indicates an air controlling valve. On the table 8 is a rock lever or yoke 51 oscillatively supported in bearings 92 and having an arm 93 connected by a link 94 with an end of a rock lever 95, the opposite end of said lever having roller 96 which coöperates with cam 97 on main cam shaft 24. The disposition is such that the cam 97 positively rocks the yoke to the right (Fig. 3), movement in the opposite direction being effected by coil spring 89, the tension of which is adjustable. In the present embodiment the material from which the sides of the bags are made is supplied in the web form and the numeral 99 indicates a roll of material, in the present instance a roll of tissue paper, supported on brackets 100 projecting upwardly from a paper feeding, supporting and positioning table 101 disposed above the main table 8. A strap brake 102 may be employed to slightly oppose the feed of the paper and prevent overrunning. From the roll 99 the tissue web passes beneath a guide bar 103, thence beneath a brush 104, the tension of which may be adjusted, as illustrated, and thence beneath a narrow glue roller 105 above the paper feed table 101. At certain positions spaced longitudinally of the feed of the paper web lines of pneumatic gripper openings 106 and 107 in the table communicate with passageways 108 and 109 (Fig. 7) in turn communicating through a pipe 110 with the air valve 49 (Figs. 1, 9, 10), which latter controls the passage of air through the gripper openings 106 and 107 so that a partial vacuum may be established in the passageways and cause a gripping of the paper to the paper feed table at predetermined times. From the valve 49 a vacuum pipe 111 leads to the pump 11. The valve 49 may be rotated in one direction to establish communication between the pipes 110 and 111, and in the opposite direction to cut off communication therebetween and connect pipe 110 with the atmosphere through opening 112 (Fig. 1). This valve is moved by an arm 113 operated in one direction by a cam 114 on supplementary cam shaft 25, and in the opposite direction by a spring 115. By operating the valve 49, the gripping effect of the openings 106 and 107 may be controlled.

Located above the paper feed table 101 are guides 116 in which the tissue web feeding device, in the present embodiment comprising a friction drag carriage 117, reciprocates longitudinally of the table. This carriage comprises an upper or body portion which supports a plate 118, said plate being vertically movable relative to the body portion, and guided by pins 119. The under face of the plate 118 is such that when it rests upon the tissue web, and is moved in a direction to feed such web, the friction is such that the tissue web will be dragged along the surface of the paper table 101 and thus fed from the supply roll. A suitable friction surface may be provided by coating the lower face of the plate 118 with soft rubber, as shown at 120. The plate 118 is made in two parts, a main relatively long part, and a supplementary relatively short part, as illustrated at 121 these parts being simultaneously reciprocal in the line of feed. The supplementary part is designed to be raised by the main part but may be lifted independently of the main part, and to this end it is supported on certain guide pins 122 passing through the body of the carriage, the descent of the supplementary part being assisted by springs 123. Certain cam pieces 124 are provided on the supplementary part for a purpose which will hereinafter appear. The raising and lowering of the friction drag plate 118 into and out of coöperation with the web is mainly effected through the instrumentality of a connecting rod 125 adjustably connected to a rock lever 126 operatively pivotally connected to a vertical reciprocating rod 127 supported in an upstanding frame piece 128 on the table, the rod 127 extending through an opening in the table (Fig. 11) and coöperating with a cam 129 on the supplementary cam shaft 25. Pivoted on the upper portion of the body of the paper feed carriage is a horizontal rock shaft 130 to an arm 131 of which the connecting rod 125 is pivoted. At each end of the rock shaft 130 is an arm 132 suitably pivotally connected to pins 133 fixed to the drag plate 118. In the path of rocking movement of the arm 131 are adjustable stops 134 and 135, the former adapted to arrest the thrust of the drag plate toward the table 8. The numeral 136 indicates a stop in the path of movement of the paper feeding carriage. In operation, and referring to Fig. 4, the cam 129 causes the rod 125 to move to the right until it is brought up against the stop 135. In this wise the drag plate 118 will be lifted from the paper feeding table 101. Further movement of the rod 125 to the right will cause the carriage and drag plate to move to the right until it shall have assumed the position of initial feeding, as shown generally in Fig. 3, whereupon the connecting rod 125 will move to the left. The initial movement to the left will rotate the shaft 130 and lower the plate 118 against the paper to be fed and the amount of pressure on the paper may be regulated by the stop 134. Having descended on the paper, further movement of the rod 125 to the left will result in the advance of the carriage and the consequent feed of the paper, the drag plate coöperating frictionally with the paper to feed the same. It will be understood that the upper face of the table 101 should be quite smooth so as to permit the paper to slide readily thereover. In the path of the cam pieces 124 on the supplementary part of the plate 118 are fixed cams 137 (Fig. 7), and as the carriage is moved past the cams 137 the supplementary part of the drag plate will be lifted from the paper and will remain out of contact therewith until recession of the drag plate. Between the main and supplementary parts of the drag plate a space is provided which is for the purpose of receiving a web cutter which operates to sever a blank or bag sheet from the web. In the present embodiment the feeding movement of the carriage is divided into two parts. It first moves sufficiently to feed the amount of web which is to be cut off; it remains at rest and in contact with the paper during the cutting operation, and it then makes a further feeding movement which advances the severed blank, or bag sheet, into certain predetermined relation relative to the form or mandrel 58 around which it is to be folded. Both the main and supplemental portions of the feed plate remain in contact with the paper while it is being cut, but upon the movement of the plate to effect the feeding of the severed bag sheet, the supplementary part 121 is raised by the cams 137 so as to avoid further feed of the web. If reference be made to Fig. 11, it will be seen that the cam 129 is so constructed as to positively move the paper feed carriage in each direction, and it will be observed that in the position shown the upper cam roller occupies a recess. This recess corresponds to the position of the carriage at the beginning of its feeding movement.

The web having been fed the predetermined amount required, a blank or bag sheet is severed therefrom by the reciprocatory cutter 139 (Figs. 3 and 7) operating transversely of the web. The teeth of this cutter are sharp on their upper ends as well as on their sides, and the points of the teeth readily pierce, or penetrate, the soft tissue. This cutter operates through a slot 140 in the table. The blade of the cutter is removably fastened in a vertically reciprocatory block 141 by a screw and clamp plate, as illustrated, the block being guided and housed by a portion of the frame. Beneath the housing is a rock shaft 142, each end of which carries an arm 143 coupled to vertically reciprocating pins 144 which, on the upward movement, force the knife through the slot 140 and the paper opposite thereto. The shaft 142 is operated by a lever 145 fulcrumed on a bracket 146 (Fig. 5) depending from the paper feed table, one arm of which lever has a pin and slot connection with an arm 147 on the shaft 142. The other arm of the lever 145 is provided with a trip pawl 148 freely movable in one direction (to the left in Fig. 3) and abutting a stop on the arm in the opposite direction. The actual operation of the trip pawl is effected by a cam 149 (Fig. 5) on one of the arms of the yoke 51. As the yoke 51 moves to the left, Fig. 3, the cam 149 wipes freely past the pawl 148, the latter turning freely on the arm 145. As the yoke returns the cam 149 comes into contact with the pawl 148 from the opposite direction and effects a sudden movement of the cutter upwardly so as to sever the paper. A suitable spring 150 is provided to yieldingly maintain the pawl 148 against the stop on the arm 145. The lowering of the cutter may be assisted or effected by springs 151 surrounding pins 152 attached to the cutter block 141, these springs at their upper ends abutting the housing, and at their lower ends coöperating with heads or ends on the pins 152.

The coöperative operations of feeding and cutting are as follows:

The paper is advanced, or fed by the drag plate and the relative construction is such that the feed of the web the proper amount brings the space between the main and supplementary drag plates opposite the cutter slot in the feed table. The web feed then ceases and both the main and supplementary plates remain on the web. While in this position the cutter is projected upwardly to sever the paper and then descends. Thereupon the feed carriage further advances, but the supplementary feed plate 124 is immediately lifted from the paper so as not to effect further feeding of the web. This further feeding, in the present embodiment, is confined entirely to the bag sheet or blank which has been severed from the web.

During the main feed of the web, the pneumatic grippers 106 in front of the cutter and the openings 107 in rear of the cutter are preferably not energized. There is therefore no resistance to the feed movement of the paper due thereto. When the feed movement ceases, to allow the cutting to take place, a partial vacuum is established in the passageways leading to the openings 106 and 107, and the effect is to cause the web to be pneumatically gripped to the table along the lines of the respective openings. Consequently when the supplementary portion of the feed plate lifts, the pneumatic grip due to the opening 106 serves to keep the end of the web in proper position on the table, and when the main portion of the feed plate lifts preliminarily to the return of the feed carriage, the pneumatic grip due to the openings 107 serves to yieldingly retain the separated bag sheet in predetermined position on the table in coöperative relation to the form 58. Inasmuch as the severed bag sheet lying upon the table is to be drawn onto a form and in a direction at right angles to the feed of the web, linear depressions 153 extending at angles to the line of openings 107 and communicating with the end openings, are provided opposite the plane of the bag sheet so as to increase the area of pneumatic grip effect and thus tend to tension and to maintain the separated bag sheet in smooth condition while it is being drawn from the table and folded around the form.

Referring to Fig. 6, the form 58 will be seen in its general position relative to the feed table, in which position it receives the separated bag sheet. It will be observed that the width of the table at this point is less than at other parts so that the bag sheet having been fed to this portion of the table will have one side overlying the form and tending to bend toward the form, the material of the bag sheet being tissue and therefore quite flexible. The position of the form to receive the bag sheet is intended to be quite close to the plane of the sheet as it lies upon the paper feed table.

As the paper web is fed along the paper feed table, the narrow glue carrying roller 105 contacts therewith and deposits a line of glue on the longitudinal edge, or side, of the web. This glue is received from the glue tank 154, and the amount deposited may be regulated by the scraper 155. The purpose of this glue is to adhesively secure the bag sheet in tubular form after it has been folded around the form, as will be clear. The roller 105 is driven by the movement of the web.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:—

1. In an apparatus of the character described, in combination, a table on which a web is adapted to slide, a drag plate adapted to press the web on the table movable relative to the table to feed the web and movable toward and from the table, means adapted to operate the drag plate comprising a carriage adapted to effect the feed movement of the drag plate, means adapted to reciprocate said carriage, and devices whereby the operation of said reciprocating means effects the movements of the drag plate toward and from the table comprising a rock arm on the carriage operatively connected to the drag plate.

2. In an apparatus of the character described, in combination, a table on which a web is adapted to slide, a drag plate adapted to press the web on the table movable relative to the table to feed the web and movable toward and from the table, means adapted to operate the drag plate comprising a carriage adapted to effect the feed movement of the drag plate, means adapted to reciprocate said carriage, devices whereby the operation of said reciprocating means effects the movements of the drag plate toward and from the table comprising a rock arm on the carriage operatively connected to the drag plate, and stops on said carriage to limit the extent of movement of said arm.

3. In an apparatus of the character described, in combination, a table on which a web is adapted to slide, a drag plate adapted to press the web on the table movable relative to the table to feed the web and movable toward and from the table, means adapted to operate the drag plate comprising a carriage adapted to effect the feed movement of the drag plate, means adapted to reciprocate said carriage, devices whereby the operation of said reciprocating means effects the movements of the drag plate toward and from the table, and means adapted to arrest the thrust of the drag plate toward said table under the influence of said reciprocating means.

4. In an apparatus of the character described, in combination, a table on which a web is adapted to slide, a drag plate adapted to press the web on the table movable relative to the table to feed the web and movable toward and from the table, a carriage with which the drag plate moves to effect feeding of the web, means to move said carriage comprising a rock member on the carriage operatively connected to effect movement of the drag plate toward said table, and means to arrest the movement of said drag plate toward said table under the influence of said carriage moving means.

5. In an apparatus of the character described, in combination, a table on which a web is adapted to slide, a drag plate adapted to press the web on the table movable relative to the table to feed the web and movable toward and from the table, a carriage for said drag plate, means to move said carriage to effect the feed movement of said drag plate, and devices whereby the operation of said carriage moving means effects movement of said drag plate toward said table.

6. In an apparatus of the character described, in combination, a table on which a web is adapted to slide, a drag plate adapted to press the web on the table movable relative to the table to feed the web and movable toward and from the table, a carriage for said drag plate, means to move said carriage to effect the feed movement of said drag plate, devices whereby the operation of said carriage moving means effects movement of said drag plate toward said table, and means adapted to coöperate with said carriage moving means to limit the movement of said drag plate toward said table.

7. In an apparatus of the character described, in combination, a table on which a web is adapted to slide, a drag plate adapted to press the web on the table movable relative to the table to feed the web and movable toward and from the table, a carriage for said drag plate, means to move said carriage to effect the feed movement of said drag plate, devices whereby the operation of said carriage moving means effects movement of said drag plate toward said table, means adapted to coöperate with said carriage moving means to limit the movement of said drag plate toward said table, comprising a rock member mounted on the carriage operatively connected to the drag plate, and a stop in the path of said rock member.

8. In an apparatus of the character described, in combination, a table on which a web is adapted to slide, and a drag plate adapted to press the web on the table movable relative to the table to feed the web and movable toward and from the table, said plate comprising web pressing portions independently movable from the table.

9. In an apparatus of the character described, in combination, a table on which a web is adapted to slide, a drag plate adapted to press the web on the table movable relative to the table to feed the web and movable toward and from the table, said plate comprising web pressing portions independently movable from the table, and means whereby feed movement of one of said portions effects movement of the other portion from the table.

10. In an apparatus of the character described, in combination, a table on which a web is adapted to slide, a drag plate adapted to press the web on the table movable relative to the table to feed the web and movable toward and from the table, said plate comprising web pressing portions independently movable from the table, means whereby feed movement of one of said portions effects movement of the other portion from the table comprising a cam-piece on the latter portion, and a cam in the path of said cam piece.

11. In an apparatus of the character described, in combination, a table on which a web is adapted to slide, a drag plate adapted to press the web on the table movable relative to the table to feed the web and movable toward and from the table, a carriage for said drag plate, means to move said carriage to effect the feed movement of said drag plate, devices whereby the operation of said carriage moving means effects movement of said drag plate toward said table, said drag plate comprising a main and a supplemental web holding plate, the latter urged toward said table independently of said carriage moving means, and connections whereby said supplemental plate is held away from said table by said main plate at predetermined times.

12. In an apparatus of the character described, in combination, a table on which a web is adapted to slide, a drag plate adapted to press the web on the table movable relative to the table to feed the web and movable toward and from the table, a carriage for said drag plate, means to move said carriage to effect the feed movement of said drag plate, devices whereby the operation of said carriage moving means effects movement of said drag plate toward said table, said drag plate comprising a main and a supplemental web holding plate, the latter urged toward said table independently of said carriage moving means, connections whereby said supplemental plate is held away from said table by said main plate at predetermined times, and means adapted to coöperate with said carriage moving means to limit the movement of said drag plate toward said table.

13. In an apparatus of the character described, in combination, a table on which a web is adapted to slide, a drag plate adapted to press the web on the table movable relative to the table to feed the web and movable toward and from the table, a carriage for said drag plate, means to move said carriage to effect the feed movement of said drag plate, devices whereby the operation of said carriage moving means effects movement of said drag plate toward said table, said drag plate comprising a main and a supplemental web holding plate, the latter urged toward said table independently of said carriage moving means, connections whereby said supplemental plate is held away from said table by said main plate at predetermined times, means adapted to coöperate with said carriage moving means to limit the movement of said drag plate toward said table comprising a rock member mounted on the carriage operatively connected to the drag plate, and a stop in the path of said rock member.

14. In an apparatus of the character described, in combination, a table on which a web is adapted to slide, a drag plate adapted to press the web on the table movable relative to the table to feed the web and movable toward the table at one point in the line of feed and from the table at another point in the line of feed, said table having pneumatic gripper openings over which the web passes, and means adapted to energize and deënergize said gripper openings at predetermined times.

15. In an apparatus of the character described, in combination, a table on which a web is adapted to slide, a drag plate adapted to press the web on the table movable relative to the table to feed the web and movable toward and from the table, a cutter adapted to sever the web, and means adapted to grip the end of the supply web to the tables.

16. In an apparatus of the character described, in combination, a table on which a web is adapted to slide, a drag plate adapted to press the web on the table movable relative to the table to feed the web and movable toward and from the table, and a cutter adapted to operate on the web, said drag plate provided with a space into which the cutter is projected.

17. In an apparatus of the character described, in combination, a table on which a web is adapted to slide, a drag plate adapted to press the web on the table movable relative to the table to feed the web and movable toward and from the table, said drag plate comprising main and supplemental web holding plates spaced apart, and independently movable away from the table, and a cutter adapted to operate on the web between said main and supplemental plates.

18. In an apparatus of the character described, in combination, a table on which a web is adapted to slide, a drag plate adapted to press the web on the table movable relative to the table to feed the web and movable toward and from the table, and a cutter adapted to operate on the web, said table having pneumatic gripper openings over which the web passes.

19. In an apparatus of the character described, in combination, a table on which a web is adapted to slide, a drag plate adapted to press the web on the table movable relative to the table to feed the web and movable toward and from the table, said drag plate comprising main and supplemental web holding plates spaced apart, and independently movable away from the table, and a cutter adapted to operate on the web between said main and supplemental plates, said table having pneumatic gripper openings on the web supply side of said cutter.

20. In an apparatus of the character described, in combination, a table on which a web is adapted to slide, a drag plate adapted to press the web on the table movable relative to the table to feed the web and movable toward and from the table, said drag plate comprising main and supplemental web holding plates spaced apart, and independently movable away from the table, and a cutter adapted to operate on the web between said main and supplemental plates, said table having pneumatic gripper openings at each side of said cutter.

21. In an apparatus of the character described, in combination, a table on which a web is adapted to slide, a drag plate adapted to press the web on the table movable relative to the table to feed the web and movable toward and from the table, a cutter adapted to sever the web intermediate the length of the drag plate, and means adapted to pneumatically grip the end of the supply web to the table.

22. In an apparatus of the character described, in combination, a feed table, means comprising pneumatic gripper openings in said table adapted to hold a web in position on said table, and a reciprocatory friction plate adapted to feed a web on said table over said openings.

23. In an apparatus of the character described, in combination, a feed table, means comprising pneumatic gripper openings in said table adapted to hold a web in position on said table, a reciprocatory friction plate adapted to feed a web on said table over said openings, and a reciprocatory piercing tooth cutter adapted to sever sheets from said web.

24. In an apparatus of the character described, in combination, a feed table, means comprising pneumatic gripper openings in said table adapted to hold a web in position on said table, a reciprocatory friction plate adapted to feed a web on said table over said openings, and means comprising a piercing tooth cutter adapted to sever said web.

25. In an apparatus of the character described, in combination, a table, a reciprocal drag plate adapted to advance a paper web on said table, a cutter adapted to sever the web on the table, paper gripping means in front and in rear of said cutter, and means adapted to cause said gripping means to grip the paper at predetermined times.

26. In an apparatus of the character described, in combination, a table, a reciprocal drag plate adapted to advance a paper web on said table, a cutter adapted to sever the web on the table, pneumatic gripper openings in said table, in front and in rear of said cutter, over which said drag plate is adapted to pass, and means adapted to energize and deënergize said openings.

27. In an apparatus of the character described, in combination, a table, a reciprocal drag plate adapted to advance a paper web on said table, a cutter adapted to sever the web on the table, pneumatic gripper openings in said table in front and in rear of said cutter, over which said drag plate is adapted to pass, and means adapted to energize and deënergize said openings, said openings including linear depressions in said table.

28. In an apparatus of the character described, in combination, a table having pneumatic gripper openings spaced apart in the line of feed of a web, a cutter adapted to sever the web between said openings, means adapted to energize and deënergize said openings at predetermined times, and means adapted to feed the web over said openings.

29. In an apparatus of the character described, in combination, a table having pneumatic gripper openings spaced apart in the line of feed of a web, a cutter adapted to sever the web between said openings, means adapted to energize and deënergize said openings at predetermined times, and means adapted to feed the web over said openings, including a drag plate reciprocal in the line of feed and toward and from said table.

30. In an apparatus of the character described, in combination, a table having pneumatic gripper openings spaced apart in the line of feed of a web, a cutter adapted to sever the web between said openings, means adapted to energize and deënergize said openings at predetermined times, means adapted to feed the web over said openings including main and supplemental drag plates simultaneously reciprocal in the line of feed, each of said plates being movable toward and from said table, and means adapted to move said supplemental drag plate from said table without moving said main plate therefrom.

In testimony whereof I affix my signature, in the presence of two witnesses.

LYNDON C. PALMER.

Witnesses:
E. L. BEIDLEMAN,
J. H. PATERSON.